April 3, 1934.  C. W. STRATFORD  1,953,730
FRACTIONATING PROCESS
Filed April 19, 1929
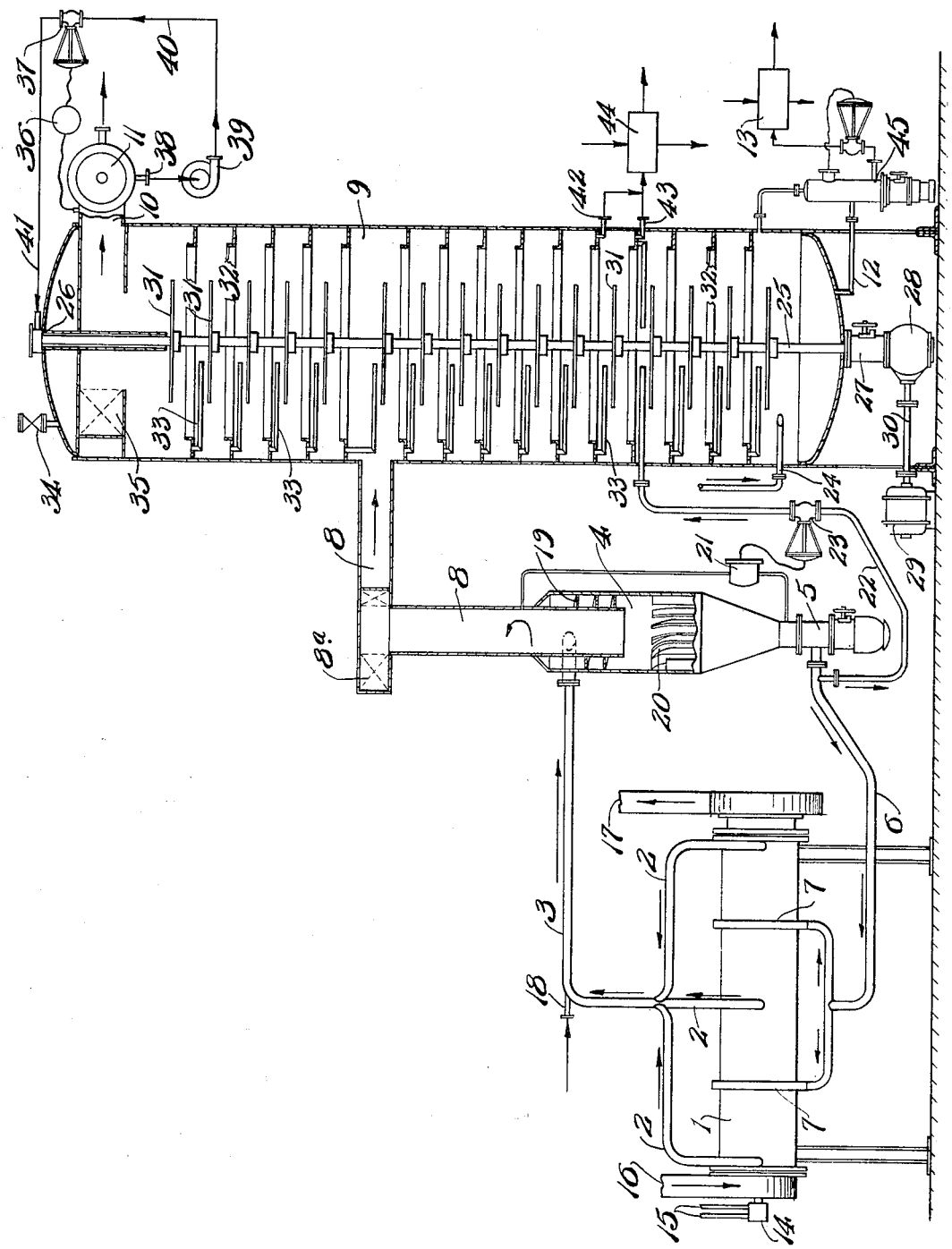
INVENTOR
*Charles Walcott Stratford*
BY
*Thos. E. Scofield*
ATTORNEY Patented Apr. 3, 1934

1,953,730

UNITED STATES PATENT OFFICE 1,953,730

FRACTIONATING PROCESS

Charles W. Stratford, Kansas City, Mo., assignor to Stratford Development Corporation, Kansas City, Mo., a corporation of Delaware Application April 19, 1929, Serial No. 356,376

5 Claims. (Cl. 196—94)

This invention relates to a process of fractionating vapors and refers more particularly to a process for fractionating oil vapors evolved from the distillation of petroleum hydrocarbons.

This application is a continuation-in-part application of my copending case, Serial No. 250,607, filed January 30, 1928, for a Disc fractionator. The present case relates to the process, while Serial No. 250,607 relates to the apparatus.

Among the salient objects of the invention are to provide a tower in which a liquid refluxing medium is coursed in counterflow relation with the vapor rising through the tower, so that the liquid is brought into intimate contact with the vapors in a plurality of stages or zones where the zones are limited by liquid films or finely divided particles projected at high velocity from rotating discs; to provide a process in which the vapors are passed through a plurality of these films of liquid particles whereby an intimate contact is effected between the liquid and vapor and a plurality of zones established in each of which a substantial equilibrium is effected between the temperatures of the liquid and vapor therein, there being included within the respective zones a definite range of boiling point products.

The single figure is a diagrammatic side elevational view of an apparatus showing a fractionating tower connected up with a distillation unit.

Referring to the drawing, at 1 is shown a still of a type described in detail in my co-pending application, Serial No. 252,757, filed February 8, 1927. This still is connected up by a plurality of headers 2 through a pipe 3 with a vaporizer 4 tapered at the bottom and having a centrifugal pump 5 mounted at the bottom thereof and by means of which unvaporized liquid may be returned to the still by the pipe 6, and headers 7. The vaporizer communicates through a vapor pipe 8 to the fractionating tower 9 from the top of which is a vapor line 10 communicating with a condenser 11. The bottoms from the tower are removed through a pipe 12 communicating with a heat exchanger 13 through which a medium is passed to acquire the heat in the withdrawn materials.

Returning to the details of the still, a burner 14 is supplied with combustible material through the pipe 15 to fire the still internally, air being added through the duct 16. Flue gases are taken off to the stack through the pipe 17. The oil is fed to the system through a pipe 18 and is passed through the line 3 into the top of the evaporator where it is preheated by being mixed with the oil discharged from the still. In the top of the vaporizer the mixture of feed stock and heated oil passes around a spiral helix 19 where it is given a whirling motion and intimate mixture and where vaporization occurs.

In the lower part of the vaporizer are a plurality of straightening vanes 20 which produce a straight line flow of the whirling liquid mixture and direct it into the pump 5 by means of which it is recirculated through the pipe 6 to the still for reheating. A liquid level control device 21 serves to maintain proper level in the vaporizer and keep the suction of the pump at all times immersed. A bleed pipe 22 in which is interposed a valve 23 diverts a portion of the hot bottoms from the vaporizer into the lower part of the fractionating tower where it adds heat to the gravitating reflux, serving to reboil a portion thereof. It is itself stripped of light components in flowing down countercurrent to rising superheated steam.

Also into the bottom of the fractionating tower is introduced steam when desired, through a pipe 24 to facilitate distillation of the liquid accumulating therein. The vapors separated in the evaporator 4 rise through the pipe 8 and, having acquired a whirling motion from the helix 19, continue to spin until they are straightened out by means of a volute positioned at 8ᵃ in the elbow of the vapor line.

Referring now to the structural details of the fractionating tower described in my co-pending application, Serial No. 250,607, a shaft 25 extending the entire length of the tower is positioned on the axis thereof and is carried by an upper bearing 26 and a lower bearing and stuffing box 27. Through a set of gears positioned in the gear box 28 the shaft is driven at a relatively low R. P. M., of the order of 300 to 500, by means of the motor 29 and drive shaft 30. This speed of the shaft is determined by the high rim speed of the discs required, amounting to approximately 100 feet per second or more. At intervals on the shaft are positioned plates 31 which are placed intermediate a plurality of circular troughs 32, these troughs having spouts 33 to discharge the liquid accumulating in the troughs onto the next plate below.

A pressure relief valve 34 is connected into the top of the tower.

In operation, the vapor introduced to the tower through the pipe 8 rises, spinning, and is directed off to the condenser 11 through a volute diagrammatically shown at 35 and the vapor line 10.

In the tower the discs project the liquid in films or in the form of finely divided particles, against the side walls of the tower, resulting in coalescence on the tower walls. There may be in a tower of this character the same velocity of mass flow as in the free section of a bubble tower, but there are not the objectionable increases in velocity through the throats of the bubble risers which cause considerable pressure drop. The distribution of down-flowing reflux is not as satisfactory on the plates of a bubble tower as in a disc fractionator of the character described. Furthermore, there is not the pressure drop between the top and the bottom of the tower, which is an important factor particularly in high vacuum distillation to which the present fractionator is particularly adapted.

The tower may be divided into an upper rectifying head and bottom exhausting stripping sections, utilizing the distribution elements in the form of projecting discs for distribution of the refluxing medium. The high peripheral velocity of the discs and the amount of liquid projected will determine the character of the curtain or film through which the vapors pass in their travel from the bottom to the top of the tower.

A temperature control mechanism 36 connected into the top of the tower functions the diaphragm valve 37 and controls the amount of reflux liquid which is recycled from the condenser from the pipe 38, pump 39 and pipes 40 and 41. The pump 39 may also discharge distillate from the system. This control reflux is introduced into the top of the tower around the bearing supporting the upper end of the shaft and is discharged onto the top rotating plate 31. The shaft rotates the plates and consequently the liquid discharged upon this upper plate is broken up into relatively fine particles and discharged or projected as a film onto the sides of the tower. The film at the axis of the tower or adjacent the shaft is relatively thicker or has more depth of liquid than the film as it contacts with the inside surface of the tower. The liquid driven against the inside surface of the tower flows down and accumulates in the upper trough 32 and is discharged by the spout 33 onto the next adjacent rotating plate below. Thus the liquid courses downwardly successively from plate to plate to the bottom of the tower.

The vapor discharged into the tower through the pipe 8 and that evolved by the distillation of the liquid accumulating in the tower due to the introduction of steam or the heat supplied by residual material introduced through the pipe 22 rises, flowing against the travel of the gravitating liquid reflux. At any desired stages, such as those selected for the connections 42 and 43, distillate may be drawn off from the tower for the purpose of manufacturing oil or other plate distillates. A heat exchanger 44 is interposed in the draw-off line and through this heat exchanger is circulated a medium for acquiring the heat contained in the withdrawn liquid.

In handling hot oil, a pump 45 of the type disclosed in my co-pending application, Serial No. 250,605, filed January 30, 1928, is required for the removal of bottoms from the fractionator. The pump 39 may be of the same type as the pump 45. It is also understood that a pump of the same type as pump 45 may be applied to the distillate withdrawal lines 42 and 43 for the purpose of pumping out hot distillates through the heat exchanger 44.

It is understood that a tower of this type, while shown connected up to a system in which oil is distilled under atmospheric pressure for the production of straight run products, may as well be used in a system upon which high vacuum is maintained for the production of lubricating oils or in a cracking system for the destructive conversion of petroleum hydrocarbons under high pressure in the manufacture of motor fuels such as gasoline and the like. It is contemplated that the tower may be operated under vacuum, atmospheric conditions or pressure.

As suggested, the novelty in this manner of fractionating lies primarily in the establishment of a plurality of equilibrium zones, each zone limited by an upper and lower film of liquid or a screen comprising a multitude of discrete particles, ultra-microscopic in size, depending upon the velocity of the traveling discs or plates 31. The zones between the films of liquid created by the discs constitute equilibrium zones in which materials exist in liquid or vapor phase but in substantial equilibrium, the temperature or range of boiling point of the products contained in the separate zones being the same and ranging progressively from the top to the bottom, the lower boiling point products existing in the upper zones and the higher boiling point products existing in the lower zones.

I claim as my invention:

1. In the vacuum distillation of lubricating oil stocks for the production of lubricating oil distillates, the process which comprises vaporizing lubricating oil stock in a vacuum distilling zone, passing the vapors evolved through a series of condensing zones of gradually decreasing temperature in each of which the vapors are brought into intimate contact with condensate centrifugally projected across the path of the vapors to form liquid films, passing condensate produced in each zone into the next preceding zone of higher temperature, applying a substantially uniform high vacuum to the oil constituents in said distilling and condensing zones, and withdrawing condensate from each zone in which the condensate therein is a desired product.

2. The method of maintaining a substantially uniform vacuum in a vacuum oil distilling system comprising a vacuum still and rectifying tower, which comprises passing the vapors from the still through a plurality of rectifying zones in said tower through which zones the vapors pass in a substantially free-flowing stream, and effecting the rectification of said vapors passing through said zones by centrifugally projecting condensate in the form of liquid films through the vapors passing through each zone.

3. A process for fractionating hydrocarbon oils including the steps of heating a hydrocarbon oil to vaporizing temperature, separating oil vapors thus formed from unvaporized oil, passing the vapors into a fractionating zone in which liquid oil is formed by condensation of a portion of the vapors, centrifugally projecting the liquid oil to form a plurality of dynamic liquid films which define successive condensing zones, and passing the oil vapors countercurrent to liquid oil in said fractionating zone while maintaining the fractionating zone under sub-atmospheric pressure.

4. A process for fractionating oil vapors comprising vaporizing hydrocarbon oil, contacting vapors countercurrently with reflux condensate thereof in a series of fractionating zones, limiting the individual fractionating zones by centrifugally projecting reflux condensate across the path of the vapors to form liquid films defining the respective zones and maintaining a sub-atmospheric pressure on said zones.

5. A process for fractionating oil vapors comprising vaporizing hydrocarbon oil, contacting vapors countercurrently with reflux condensate thereof in a series of fractionating zones, limiting the individual fractionating zones by centrifugally projecting reflux condensate across the path of the vapors to form liquid films defining the respective zones, maintaining a sub-atmospheric pressure on said zones and withdrawing selected reflux condensate as a side stream.

CHARLES W. STRATFORD.